(12) United States Patent
Wu

(10) Patent No.: US 11,769,343 B2
(45) Date of Patent: Sep. 26, 2023

(54) FINGERPRINT SENSOR, FINGERPRINT MODULE, AND TERMINAL DEVICE

(71) Applicant: VIVO MOBILE COMMUNICATION CO., LTD., Chang'an Dongguan (CN)

(72) Inventor: Huaping Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/522,535

(22) Filed: Nov. 9, 2021

(65) Prior Publication Data

US 2022/0067329 A1 Mar. 3, 2022

Related U.S. Application Data

(63) Continuation of application No. PCT/CN2020/085849, filed on Apr. 21, 2020.

(30) Foreign Application Priority Data

May 9, 2019 (CN) .......................... 201910386396.0

(51) Int. Cl.
*G06K 9/20* (2006.01)
*G06V 40/13* (2022.01)
*G06V 10/147* (2022.01)

(52) U.S. Cl.
CPC ........ *G06V 40/1318* (2022.01); *G06V 10/147* (2022.01)

(58) Field of Classification Search
CPC ............ G06V 40/1318; G06V 40/13–40/1329
See application file for complete search history.

(56) References Cited

U.S. PATENT DOCUMENTS 9,189,675 B2 11/2015 Kim
2009/0067684 A1* 3/2009 Mainguet ........... G06V 40/1306
382/124

(Continued)

FOREIGN PATENT DOCUMENTS

CN 105474300 A 4/2016
CN 105718849 A 6/2016

(Continued)

OTHER PUBLICATIONS

International Search Report and Written Opinion related to Application No. PCT/CN2020/085849 dated Nov. 2, 2021.

(Continued)

*Primary Examiner* — Brian Werner
(74) *Attorney, Agent, or Firm* — von Briesen & Roper, s.c.

(57) ABSTRACT

The present disclosure provides a fingerprint sensor, a fingerprint module, and a terminal device. The fingerprint sensor has a sensing array, the sensing array includes a plurality of pixel sets, each pixel set includes at least one pixel unit, two adjacent pixel sets in each row of the plurality of pixel sets are electrically connected to each other via a first control line, two adjacent pixel sets in each column of the plurality of pixel sets are electrically connected to each other via a second control line, the plurality of pixel sets include at least one first pixel set, the first pixel set includes at least two pixel units, and the at least two pixel units are electrically connected to each other.

12 Claims, 3 Drawing Sheets

(56) References Cited

U.S. PATENT DOCUMENTS

| | | | |
|---|---|---|---|
| 2012/0050216 A1* | 3/2012 | Kremin | G06F 3/041661 345/174 |
| 2012/0275669 A1 | 11/2012 | Kim | |
| 2012/0288169 A1 | 11/2012 | Kim | |
| 2014/0333328 A1 | 11/2014 | Nelson | |
| 2014/0354597 A1 | 12/2014 | Kitchens, II | |
| 2015/0091948 A1 | 4/2015 | Kwa | |
| 2017/0199610 A1 | 7/2017 | Kitchens, II | |
| 2018/0173926 A1 | 6/2018 | Wang | |
| 2019/0034686 A1 | 1/2019 | Ling | |
| 2020/0019746 A1* | 1/2020 | Fan | G02B 5/208 |
| 2020/0097696 A1 | 3/2020 | Yao et al. | |
| 2021/0019497 A1 | 1/2021 | Zhu | |

FOREIGN PATENT DOCUMENTS

| | | |
|---|---|---|
| CN | 108389508 A | 8/2018 |
| CN | 108564015 A | 9/2018 |
| CN | 109313706 A | 2/2019 |
| CN | 109564338 A | 4/2019 |
| CN | 110175536 A | 8/2019 |
| CN | 109313706 B | 11/2020 |
| JP | 2007249950 A | 9/2007 |
| JP | 2015201164 A | 11/2015 |
| JP | 2016530590 A | 9/2016 |
| WO | 2015047331 A1 | 4/2015 |

OTHER PUBLICATIONS

Chinese Office Action related to Application No. 201910386396.0 dated Oct. 9, 2020.

Indian Office Action related to Application No. 202127053846 dated Apr. 22, 2022.

Extended European Search Report related to Application No. 20802356.4 dated Jun. 10, 2022.

Japanese Office Action related to Application No. 2021-566499 dated Dec. 1, 2022.

* cited by examiner

FINGERPRINT SENSOR, FINGERPRINT MODULE, AND TERMINAL DEVICE

CROSS-REFERENCE TO RELATED APPLICATION

This application is a continuation application of PCT Application No. PCT/CN2020/085849 filed on Apr. 21, 2020, which claims priority to Chinese Patent Application No. 201910386396.0 filed in China on May 9, 2019, disclosures of which are incorporated herein by reference in their entireties.

TECHNICAL FIELD

The present disclosure relates to the field of communications technologies, and in particular, to a fingerprint sensor, a fingerprint module, and a terminal device.

BACKGROUND

With the development of science and technology, an existing terminal device is generally equipped with a fingerprint module. In the related art, a fingerprint sensor in a fingerprint module is provided with a plurality of pixel units. Row scanning and column scanning are performed on the plurality of pixel units of the fingerprint sensor, to expose and read out information on the fingerprint sensor, thereby generating a fingerprint image. Because row scanning and column scanning require long time in the related art, fingerprint image generation takes long time.

SUMMARY

According to a first aspect, an embodiment of the present disclosure provides a fingerprint sensor, where the fingerprint sensor has a sensing array, the sensing array includes a plurality of pixel sets, and each pixel set includes at least one pixel unit;

two adjacent pixel sets in each row of the plurality of pixel sets are electrically connected to each other via a first control line, and two adjacent pixel sets in each column of the plurality of pixel sets are electrically connected to each other via a second control line; and the plurality of pixel sets include at least one first pixel set, the first pixel set includes at least two pixel units, and the at least two pixel units are electrically connected to each other.

According to a second aspect, an embodiment of the present disclosure further provides a fingerprint module, including a lens, an infrared filter and the foregoing fingerprint sensor, where the lens, the infrared filter, and the fingerprint sensor are stacked in sequence.

According to a third aspect, an embodiment of the present disclosure further provides a terminal device, including the foregoing fingerprint module.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings.

DETAILED DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
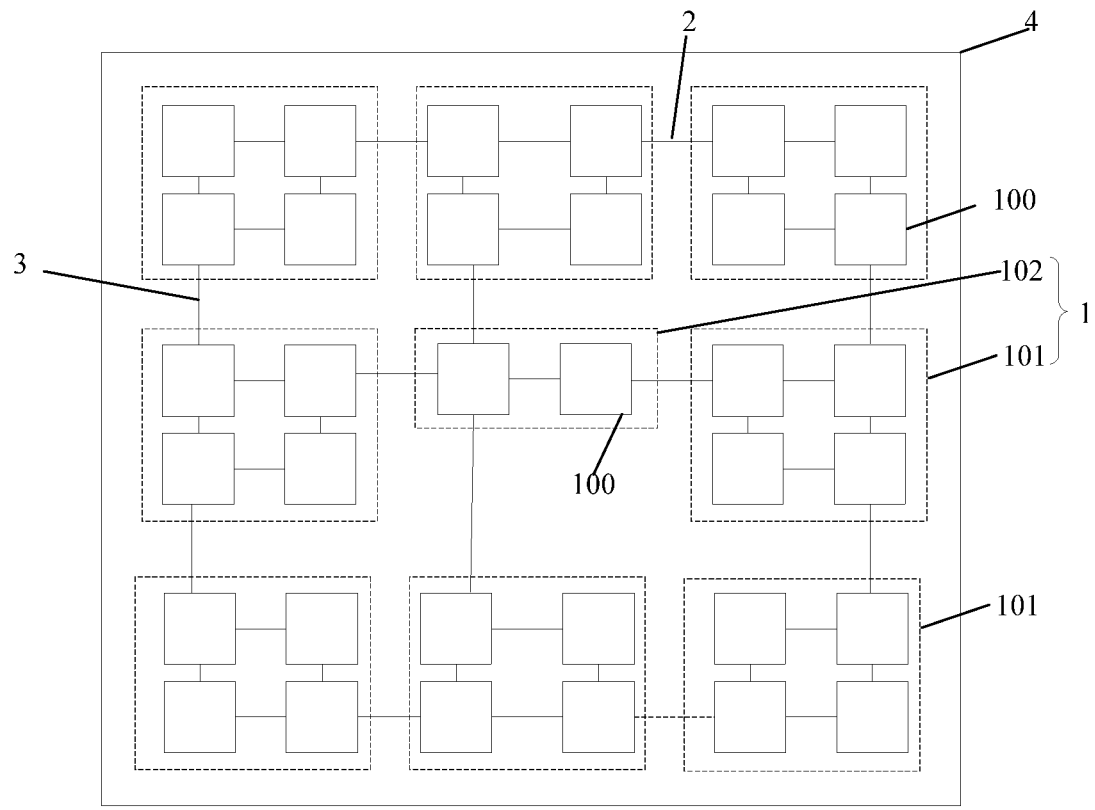
FIG. 1 is a schematic diagram of a distribution structure of pixel sets on a fingerprint sensor according to an embodiment of the present disclosure.

Referring to FIG. 1, which is a schematic structural diagram of a sensing surface of a fingerprint sensor according to an embodiment of the present disclosure, the fingerprint sensor has a sensing array, where the sensing array includes a plurality of pixel sets 1, and each pixel set 1 includes at least one pixel unit 100;

two adjacent pixel sets 1 in each row of the plurality of pixel sets 1 are electrically connected to each other via a first control line 2, and two adjacent pixel sets 1 in each column of the plurality of pixel sets 1 are electrically connected to each other via a second control line 3; and the plurality of pixel sets 1 include at least one first pixel set 101, the first pixel set 101 includes at least two pixel units 100, and the at least two pixel units 100 are electrically connected to each other.

For a working principle of this embodiment of the present disclosure, refer to the following.

Because the fingerprint sensor is provided with a plurality of pixel sets 1, when row scanning and column scanning are performed on the fingerprint sensor, only the plurality of pixel sets 1, rather than each pixel unit 100, need to be scanned, thereby shortening time required for row scanning and column scanning, that is, total time required for scanning is shortened. Further, time required for fingerprint image generation is shortened, and time required for unlocking a terminal device using a fingerprint is shortened accordingly.

The first control line 2 may also be referred to as a scanning line, and the second control line 3 may also be referred to as a data line.

A quantity of first pixel sets 101 is not limited herein. In addition, all the first pixel sets 101 may be located on the sensing surface 4 of the fingerprint sensor. However, a specific position of the first pixel set 101 on the sensing surface 4 is not limited herein. For example, the first pixel set 101 may be located at a position near an edge of the sensing surface 4 and/or a central position on the sensing surface 4.

A connection manner in which a plurality of pixel units 100 included by each first pixel set 101 are electrically connected to one another is not limited herein. For example, the plurality of pixel units 100 may be connected to one another in sequence. Alternatively, two adjacent pixel units 100 are electrically connected to each other, and a first pixel unit 100 and a last pixel unit 100 are electrically connected to each other. Alternatively, the first pixel unit 100 is electrically connected to a pixel unit 100 at a middle position, and then electrically connected to another pixel unit 100.

Figure 2:
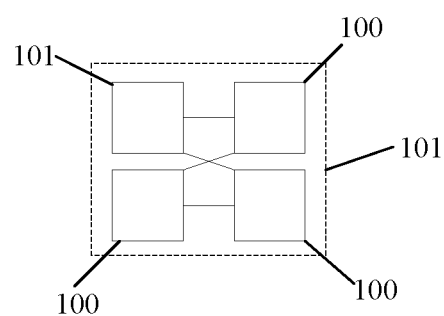
FIG. 2 is a schematic diagram of connection among pixel units in a first pixel set according to an embodiment of the present disclosure.

For example, when the first pixel set 101 includes four pixel units 100, referring to FIG. 2, the four pixel units 100 may be distributed in an array. Specifically, for a manner in which the four pixel units 100 are electrically connected to one another, refer to FIG. 2, that is, a first pixel unit located at an upper left corner may be electrically connected to a third pixel unit located at a lower right corner and a second pixel unit located at an upper right corner, separately; and a fourth pixel unit located at a lower left corner may be electrically connected to the second pixel unit and the third pixel unit, separately.

In this embodiment of the present disclosure, because only a plurality of pixel sets 1, rather than each pixel unit 100, need to be scanned during row scanning and column scanning, scanning time is shortened, thereby shortening time required for fingerprint image generation.

Optionally, the plurality of pixel sets 1 further includes at least one second pixel set 102. The second pixel set 102 includes at least one pixel unit 100.

When the second pixel set 102 includes one pixel unit 100, the second pixel set 102 may be equated with the pixel unit 100. When the second pixel set 102 includes a plurality of pixel units 100, the plurality of pixel units 100 may perform independent display. Alternatively, the plurality of pixel units 100 may be electrically connected to one another.

Positions of the second pixel set 102 and the first pixel set 101 are not limited herein. For example, the second pixel set 102 may be located at a center position on the sensing surface 4 of the fingerprint sensor, but the first pixel set 100 may be located at an edge position on the sensing surface 4 of the fingerprint sensor. On the contrary, the first pixel set 100 may be located at a center position on the sensing surface 4 of the fingerprint sensor, but the second pixel set 102 may be located at an edge position on the sensing surface 4 of the fingerprint sensor.

In addition, the second pixel set 102 and the first pixel set 101 may include the same quantity or different quantities of pixel units 100. Optionally, a quantity of the pixel units 100 included by the second pixel set 102 is less than a quantity of the pixel units 100 included by the first pixel set 101.

It should be noted that, when a plurality of pixel units 100 included by a pixel set 1 are electrically connected to one another, the larger the quantity of the pixel units 100 is, the higher the photo-sensibility at a position that is on the fingerprint sensor and that corresponds to the pixel set 1 is.

In this embodiment of the present disclosure, the plurality of pixel sets 1 include the first pixel set 101 and the second pixel set 102, the first pixel set 101 includes a plurality of pixel units 100, and the second pixel set includes at least one pixel unit 100. Therefore, photo-sensibility of the fingerprint sensor can be changed by changing the quantity of first pixel sets 101 or second pixel sets 102 in the fingerprint sensor.

Optionally, referring to FIG. 1, the quantity of the pixel units 100 included by the second pixel set 102 is less than the quantity of the pixel units 100 included by the first pixel set 101.

For example, the second pixel set 102 may include two pixel units 100, and the two pixel units 100 are electrically connected to each other; and the first pixel set 101 may include four pixel units 100, and the four pixel units 100 are electrically connected to one another.

In this embodiment of the present disclosure, because the quantity of the pixel units 100 included by the second pixel set 102 is less than the quantity of the pixel units 100 included by the first pixel set 101, photo-sensibility at a position where the second pixel set 102 is located is lower than photo-sensibility at a position where the first pixel set 101 is located. In this case, photo-sensibility at a position on the fingerprint sensor may vary depending on whether the first pixel set 101 or the second pixel set 102 is set at the position, thereby improving photo-sensibility setting flexibility of the fingerprint sensor.

Figure 3:
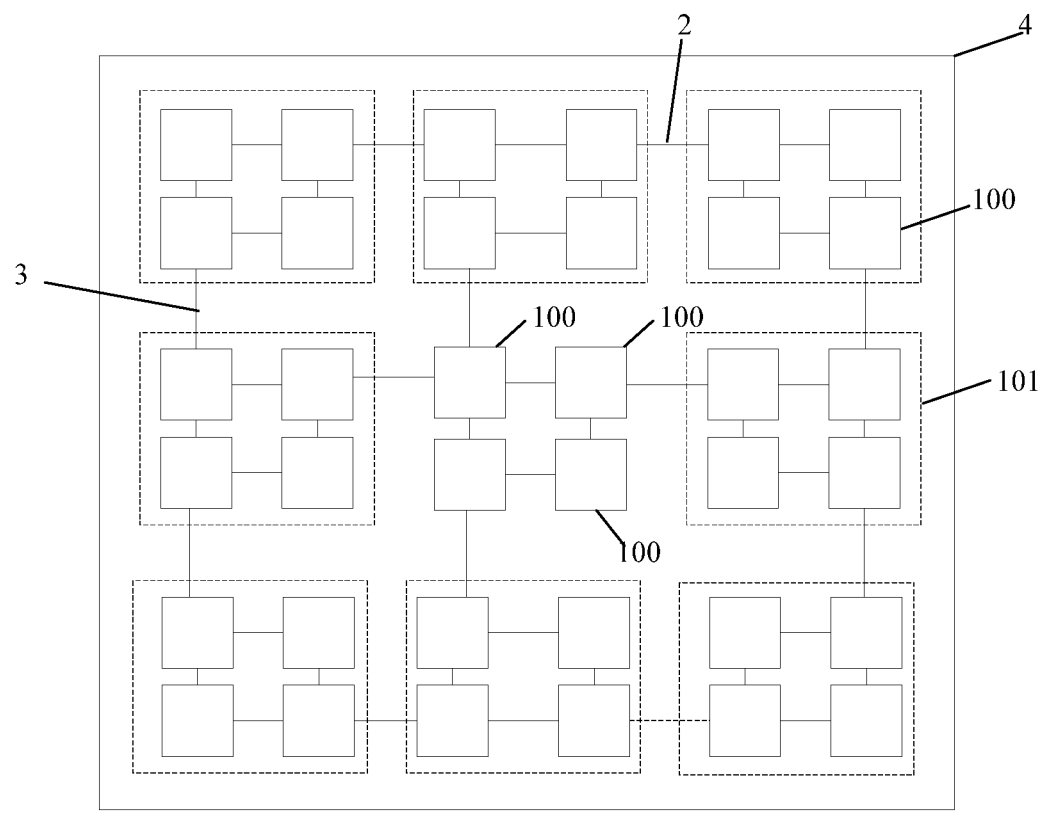
FIG. 3 is a schematic diagram of a distribution structure of pixel sets on another fingerprint sensor according to an embodiment of the present disclosure.

Optionally, referring to FIG. 3, each second pixel set 102 includes one pixel unit 100.

When the second pixel set 102 includes one pixel unit 100, the second pixel set 102 is the pixel unit 100.

In this embodiment of the present disclosure, the second pixel set 102 includes one pixel unit 100, which can reduce a production cost and difficulty of a manufacturing process on the premise that resolving power of the fingerprint sensor is guaranteed.

Optionally, the fingerprint sensor includes a sensing surface 4, the sensing surface 4 includes a first sensing area and a second sensing area, the first sensing area is an area near a center of the sensing surface 4, and the second sensing area is an area that is on the sensing surface 4 and that is different from the first sensing area.

All the first pixel sets 101 are located in the second sensing area, and all the second pixel sets 102 are located in the first sensing area.

For a working principle of this embodiment of the present disclosure, refer to the following descriptions.

Figure 4:
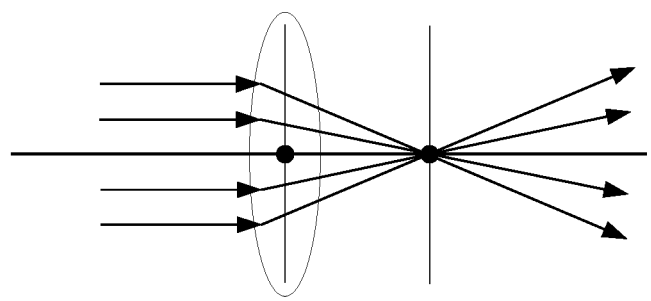
FIG. 4 is a schematic diagram of light transmission of a lens in a fingerprint module according to an embodiment of the present disclosure.

Referring to FIG. 4, an arrow in FIG. 4 represents a propagation direction of light, and an oval in FIG. 4 represents a convex lens. An existing lens usually uses a convex lens. Under the light condensing action of the convex lens, a center position of an image obtained via the convex lens is brighter and clearer than an edge position of the image. In this embodiment of the present disclosure, all the first pixel sets 101 are located in the second sensing area, at least two pixel units 100 included by the first pixel set 101 are electrically connected to each other, and the quantity of the pixel units 100 included by the second pixel set 102 located in the first sensing area is less than the quantity of the pixel units 100 included by the first pixel set 101. Therefore, receiving sensitivity and full well capacity at a position that is on the second sensing area and that corresponds to the first pixel set 101 can be improved. In a case that exposure time and gain are not changed, photo-sensibility at a position that is on the second sensing area and that corresponds to the first pixel set 101 can be improved, thereby making a corresponding position of an obtained image brighter and clearer. It should be noted that, the image is generally a fingerprint image.

The first sensing area may be an area in a very center of the sensing surface 4. In addition, a shape of the first sensing area is not limited herein. For example, the first sensing area may be a rectangular area.

The second sensing area may be an area that is on the sensing surface 4 and that is different from the first sensing area. When the first sensing area is in a center of the sensing surface 4, the second sensing area may be an area that is on the sensing surface 4 and that surrounds the first sensing area. A shape of the second sensing area is also not limited herein. For example, when the first sensing area is a rectangular area, the second sensing area may be a rectangular ring-shaped area, while an inner-ring area of the rectangular ring-shaped area is the first sensing area.

In this embodiment of the present disclosure, all the first pixel sets 101 are located in the second sensing area. Therefore, photo-sensibility and sensitivity of the second sensing area can be improved, thereby making a second sensing area of an obtained image to be brighter and clearer, and improving imaging quality of the image.

Optionally, a quantity of the first pixel sets 101 is at least two, the second sensing area includes a first sub-sensing area and a second sub-sensing area, the first sub-sensing area is located between the first sensing area and the second sub-sensing area, the first pixel sets 101 are respectively located in the first sub-sensing area and the second sub-sensing area, and a quantity of the pixel units 100 included by the first pixel set 101 located in the first sub-sensing area is less than a quantity of the pixel units 100 included by the first pixel set 101 located in the second sub-sensing area.

For example, the second pixel set 102 located in the first sensing area may include one pixel unit 100, the first pixel set 101 located in the first sub-sensing area may include two pixel units 100, and the first pixel set 101 located in the second sub-sensing area may include four pixel units 100.

The second sensing area may further include a third sub-sensing area and a fourth sub-sensing area. A quantity of pixel units 100 included by a first pixel set 101 located in the third sub-sensing area may be greater than the quantity of the pixel units 100 included by the first pixel set 101 located in the second sub-sensing area. A quantity of pixel units 100 included by a first pixel set 101 located in the fourth sub-sensing area may be greater than the quantity of the pixel units 100 included by the first pixel set 101 located in the third sub-sensing area. It should be noted that, according to the foregoing principle, the second sensing area may further include a fifth sub-sensing area and the like. A specific quantity of sub-sensing areas included by the second sensing area and a specific position of each sub-sensing area in the second sensing area are not limited herein.

In this embodiment of the present disclosure, due to a light condensing action of a convex lens, photo-sensibility of a sensing surface 4 declines gradually from a center position on the sensing surface 4 to an edge position on the sensing surface 4. In this case, the photo-sensibility of the entire sensing surface 4 can be more uniform by setting quantities of pixel units 100 included by first pixel sets 101 located in different sub-sensing areas of the second sensing area to be progressive.

Optionally, each first pixel set 101 includes M*M pixel units 100, the M*M pixel units 100 are distributed in an array, and M is a positive integer greater than 1.

For example, when M is 2, each first pixel set 101 includes four pixel units 100, and the four pixel units 100 are distributed in an array. Alternatively, when M is 3, each first pixel set 101 includes nine pixel units 100, and the nine pixel units 100 are distributed in an array.

In this embodiment of the present disclosure, each first pixel set 101 includes M*M pixel units 100, and the M*M pixel units 100 are distributed in an array. Therefore, photo-sensibility at positions that correspond to the first pixel sets 101 and that are on the fingerprint sensor is more uniform, thereby improving quality of a generated fingerprint image.

Optionally, two adjacent pixel units 100 of the at least two pixel units 100 are connected in series.

That the two adjacent pixel units 100 of the at least two pixel units 100 are connected in series may be: two adjacent pixel units 100 in at least two pixel units 100 included by the first pixel set 101 are connected in series.

In this embodiment of the present disclosure, when two adjacent pixel units 100 in the at least two pixel units 100 included by the first pixel set 101 are connected in series, photo-sensibility at a position that is on the fingerprint sensor and that corresponds to the entire first pixel set 101 can be enhanced.

Optionally, two adjacent pixel units 100 of the at least two pixel units 100 are connected in parallel.

That the two adjacent pixel units 100 of the at least two pixel units 100 are connected in parallel may be: two adjacent pixel units 100 in at least two pixel units 100 included by the first pixel set 101 are connected in parallel.

In this embodiment of the present disclosure, when the two adjacent pixel units 100 in the at least two pixel units 100 included by the first pixel set 101 are connected in parallel, photo-sensibility at a position that is on the fingerprint sensor and that corresponds to the entire first pixel set 101 can also be enhanced.

Figure 5:
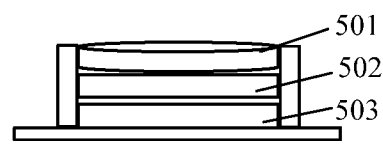
FIG. 5 is a schematic structural diagram of a fingerprint module according to an embodiment of the present disclosure.

Referring to FIG. 5, an embodiment of the present disclosure further provides a fingerprint module, including a lens 501, an infrared filter 502 and the foregoing fingerprint sensor 503. The lens 501, the infrared filter 502, and the fingerprint sensor 503 are stacked in sequence.

In this embodiment of the present disclosure, the foregoing fingerprint sensor 503 is included. For a structure of the fingerprint sensor 503, see the foregoing embodiments. Details are not described herein. Because the fingerprint sensor 503 in the foregoing embodiments is used in this embodiment of the present disclosure, the fingerprint module provided in this embodiment of the present disclosure has the same beneficial effects as the fingerprint sensor 503 in the foregoing embodiments.

An embodiment of the present disclosure further provides a terminal device, including the foregoing fingerprint module.

The terminal device further includes a display screen 6. The display screen 6 may be a liquid crystal display (LCD) or an organic light emitting display (OLED). A specific type of the display screen 6 is not limited herein.

Figure 6:
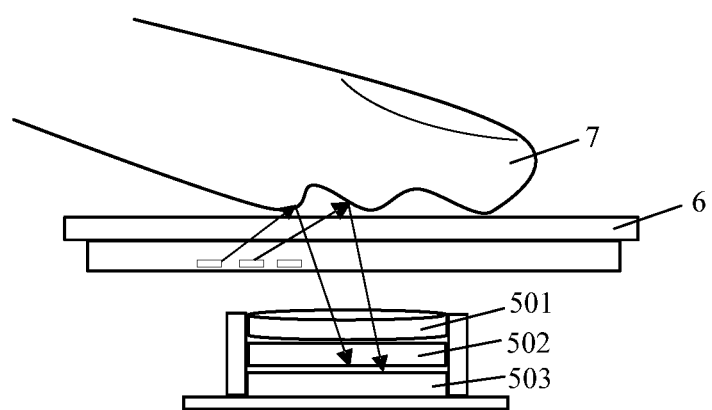
FIG. 6 is a schematic diagram of fingerprint acquisition of a terminal device according to an embodiment of the present disclosure.

For example, referring to FIG. 6, when the display screen 6 is the OLED, a principle according to which the terminal device generates a fingerprint image may be: infrared light emitted from the display screen 6 is reflected when meeting a fingerprint 7 on an upper surface of the display screen 6, reflected infrared light is incident on the lens 501, and reaches the sensing surface of the fingerprint sensor 503 after passing through the infrared filter 502. The fingerprint sensor 503 converts an optical signal into an electrical signal. Then, an analog-digital converter of the terminal device performs data collection to generate the fingerprint image. It should be noted that, directions of arrows in FIG. 6 represent propagation directions of the infrared light and the reflected infrared light.

Using the fingerprint sensor 503 in the foregoing embodiments, the terminal device in this embodiment of the present disclosure can also make a position corresponding to an obtained image brighter and clearer, thereby improving imaging quality of the image.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A fingerprint sensor, wherein the fingerprint sensor has a sensing array, the sensing array comprises a plurality of pixel sets, and each pixel set comprises at least one pixel unit;
   two adjacent pixel sets in each row of the plurality of pixel sets are electrically connected to each other via a scanning line, and two adjacent pixel sets in each column of the plurality of pixel sets are electrically connected to each other via a data line; and
   the plurality of pixel sets comprise at least one first pixel set, the first pixel set comprises at least two pixel units, and the at least two pixel units are electrically connected to each other;
   the plurality of pixel sets further comprise at least one second pixel set, and the second pixel set comprises at least one pixel unit;
   wherein a quantity of pixel units comprised by the second pixel set is less than a quantity of pixel units comprised by the first pixel set;
   wherein the fingerprint sensor comprises a sensing surface, wherein the sensing surface comprises a first sensing area and a second sensing area, the first sensing area is an area near a center of the sensing surface, and the second sensing area is an area that is on the sensing surface and that is different from the first sensing area; and
   all the first pixel sets are located in the second sensing area, and all the second pixel sets are located in the first sensing area;
   wherein a quantity of first pixel sets is at least two, the second sensing area comprises a first sub-sensing area and a second sub-sensing area, the first sub-sensing area is located between the first sensing area and the second sub-sensing area, the first pixel sets are respectively located in the first sub-sensing area and the second sub-sensing area, and a quantity of pixel unit comprised by the first pixel set located in the first sub-sensing area is less than a quantity of pixel units comprised by the first pixel set located in the second sub-sensing area.

2. The fingerprint sensor according to claim 1, wherein each second pixel set comprises one pixel unit.

3. The fingerprint sensor according to claim 1, wherein each first pixel set comprises M*M pixel units, the M*M pixel units are distributed in an array, and M is a positive integer greater than 1.

4. The fingerprint sensor according to claim 3, wherein the first pixel set comprises four pixel units, the four pixel units comprises a first pixel unit, a second pixel unit, a third pixel unit and a fourth pixel unit which are distributed in an array; the first pixel unit is located at an upper left corner, the second pixel unit is located at an upper right corner, the third pixel unit is located at a lower right corner, and the fourth pixel unit is located at a lower left corner;
   the first pixel unit is electrically connected to the third pixel unit and the second pixel unit respectively; and
   the fourth pixel unit is electrically connected to the second pixel unit and the third pixel unit respectively.

5. The fingerprint sensor according to claim 1, wherein two adjacent pixel units of the at least two pixel units are connected in series.

6. The fingerprint sensor according to claim 1, wherein two adjacent pixel units of the at least two pixel units are connected in parallel.

7. A fingerprint module, comprising a lens, an infrared filter, and a fingerprint sensor,
   wherein the fingerprint sensor has a sensing array, the sensing array comprises a plurality of pixel sets, and each pixel set comprises at least one pixel unit;
   two adjacent pixel sets in each row of the plurality of pixel sets are electrically connected to each other via a scanning line, and two adjacent pixel sets in each column of the plurality of pixel sets are electrically connected to each other via a data line; and
   the plurality of pixel sets comprise at least one first pixel set, the first pixel set comprises at least two pixel units, and the at least two pixel units are electrically connected to each other;
   the plurality of pixel sets further comprise at least one second pixel set, and the second pixel set comprises at least one pixel unit;
   wherein a quantity of pixel units comprised by the second pixel set is less than a quantity of pixel units comprised by the first pixel set;
   wherein the fingerprint sensor comprises a sensing surface, wherein the sensing surface comprises a first sensing area and a second sensing area, the first sensing area is an area near a center of the sensing surface, and the second sensing area is an area that is on the sensing surface and that is different from the first sensing area; and
   all the first pixel sets are located in the second sensing area, and all the second pixel sets are located in the first sensing area;
   wherein a quantity of first pixel sets is at least two, the second sensing area comprises a first sub-sensing area and a second sub-sensing area, the first sub-sensing area is located between the first sensing area and the second sub-sensing area, the first pixel sets are respectively located in the first sub-sensing area and the second sub-sensing area, and a quantity of pixel units comprised by the first pixel set located in the first sub-sensing area is less than a quantity of pixel units comprised by the first pixel set located in the second sub-sensing area;
   wherein the lens, the infrared filter, and the fingerprint sensor are stacked in sequence.

8. The fingerprint module according to claim 7, wherein each second pixel set comprises one pixel unit.

9. The fingerprint module according to claim 7, wherein each first pixel set comprises M*M pixel units, the M*M pixel units are distributed in an array, and M is a positive integer greater than 1.

10. The fingerprint module according to claim 9, wherein the first pixel set comprises four pixel units, the four pixel units comprises a first pixel unit, a second pixel unit, a third pixel unit and a fourth pixel unit which are distributed in an array; the first pixel unit is located at an upper left corner, the second pixel unit is located at an upper right corner, the third pixel unit is located at a lower right corner, and the fourth pixel unit is located at a lower left corner;
   the first pixel unit is electrically connected to the third pixel unit and the second pixel unit respectively; and the fourth pixel unit is electrically connected to the second pixel unit and the third pixel unit respectively.

11. The fingerprint module according to claim 7, wherein two adjacent pixel units of the at least two pixel units are connected in series.

12. A terminal device, comprising the fingerprint module according to claim 7.

\* \* \* \* \*